(12) United States Patent
Perna et al.

(10) Patent No.: US 9,057,790 B2
(45) Date of Patent: Jun. 16, 2015

(54) SCINTILLATION DETECTION DEVICE WITH PRESSURE SENSITIVE ADHESIVE INTERFACES

(71) Applicants: Louis Perna, Elyria, OH (US); Michael L. Bush, Ravenna, OH (US); Lance J. Wilson, Shaker Heights, OH (US)

(72) Inventors: Louis Perna, Elyria, OH (US); Michael L. Bush, Ravenna, OH (US); Lance J. Wilson, Shaker Heights, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 227 days.

(21) Appl. No.: 13/632,046

(22) Filed: Sep. 30, 2012

(65) Prior Publication Data
US 2013/0092828 A1 Apr. 18, 2013

Related U.S. Application Data

(60) Provisional application No. 61/541,592, filed on Sep. 30, 2011, provisional application No. 61/596,414, filed on Feb. 8, 2012.

(51) Int. Cl.
G01T 1/20 (2006.01)
G01V 5/04 (2006.01)

(52) U.S. Cl.
CPC ............... *G01T 1/2006* (2013.01); *G01V 5/04* (2013.01); *G01T 1/20* (2013.01); *G01T 1/2018* (2013.01)

(58) Field of Classification Search
CPC ........................... G01T 1/2006; G01T 1/2018
See application file for complete search history.

(56) References Cited

U.S. PATENT DOCUMENTS

| 4,720,426 A | 1/1988 | Englert et al. |
| 5,700,179 A | 12/1997 | Hasegawa et al. |
| 5,800,725 A | 9/1998 | Kato et al. |
| 5,942,445 A | 8/1999 | Kato et al. |
| 6,442,975 B1 | 9/2002 | Murakami et al. |
| 6,583,050 B2 | 6/2003 | Wenski et al. |
| 6,902,616 B1 | 6/2005 | Yamazaki et al. |
| 7,253,499 B2 | 8/2007 | Shibata |
| 7,405,430 B2 | 7/2008 | Saxler et al. |
| 7,411,273 B2 | 8/2008 | Matsumoto |
| 7,675,040 B2 | 3/2010 | Menge et al. |
| 7,723,709 B2 | 5/2010 | Zama et al. |

(Continued)

FOREIGN PATENT DOCUMENTS

| EP | 0250983 A1 | 1/1988 |
| EP | 1739460 A2 | 1/2007 |

(Continued)

OTHER PUBLICATIONS

International Search Report for PCT/US2012/058195 dated Mar. 29, 2013, 4 pgs.

*Primary Examiner* — Constantine Hannaher
(74) *Attorney, Agent, or Firm* — Abel Law Group, LLP; Robert N. Young

(57) ABSTRACT

A scintillator device includes an optically clear substrate, a scintillator plastic layer overlying the optically clear substrate, and an optically clear polymer layer between the optically clear substrate and the scintillator plastic layer. The optically clear polymer layer can mechanically and optically couple the scintillator plastic layer to the optically clear substrate. Further, the clear polymer layer can be configured to substantially reduce the formation of cracks in the scintillator plastic layer due to thermal expansion, thermal contraction, or a combination thereof, of the scintillator device.

20 Claims, 9 Drawing Sheets

(56) References Cited

U.S. PATENT DOCUMENTS

| | | |
|---|---|---|
| 7,828,628 B2 | 11/2010 | Aoki et al. |
| 2006/0134362 A1 | 6/2006 | Lu et al. |
| 2009/0261259 A1 | 10/2009 | Yip |
| 2010/0067001 A1 | 3/2010 | Corbeil et al. |
| 2010/0090111 A1* | 4/2010 | Stoller et al. ............... 250/337 |
| 2010/0116995 A1 | 5/2010 | Levene et al. |
| 2010/0163735 A1 | 7/2010 | Menge et al. |
| 2010/0193690 A1 | 8/2010 | Hunt |
| 2011/0042571 A1 | 2/2011 | Perna |
| 2011/0139991 A1* | 6/2011 | Menge ............... 250/361 R |

FOREIGN PATENT DOCUMENTS

| | | |
|---|---|---|
| WO | 2007-089746 A1 | 8/2007 |
| WO | 2008132634 A2 | 11/2008 |
| WO | WO 2010132489 A2 * | 11/2010 |
| WO | 2011028459 A2 | 3/2011 |

* cited by examiner

SCINTILLATION DETECTION DEVICE WITH PRESSURE SENSITIVE ADHESIVE INTERFACES

BACKGROUND

1. Field of the Disclosure

The present disclosure is directed to scintillation detectors, particularly to scintillation detection devices with adhesive interfaces.

2. Description of the Related Art

Scintillation detectors have been employed in various industrial applications, such as the oil and gas industry for well logging. Typically, these detectors have scintillator crystals made of certain materials effective for detecting various types of radiation, including for example, gamma rays. Generally, the scintillator crystals are enclosed in tubes or casings, which include a window permitting radiation induced scintillation light to pass out of the crystal package for measurement by a light-sensing device such as a photomultiplier tube. The photomultiplier tube converts the light photons emitted from the crystal into electrical pulses that are shaped and digitized by associated electronics that can be registered as counts and transmitted to analyzing equipment.

In many instances, assembling a scintillation detector can require a substantial amount of time. Further, the assembly process can require the use of relatively complicated fixtures, or tools, for maintaining the alignment and spacing of parts during assembly.

Accordingly, the industry continues to need improvements in scintillation devices, particularly scintillation devices that require less time and less tooling to assemble.

BRIEF DESCRIPTION OF THE DRAWINGS

The present disclosure can be better understood, and its numerous features and advantages made apparent to those skilled in the art by referencing the accompanying drawings.

The use of the same reference symbols in different drawings indicates similar or identical items.

DETAILED DESCRIPTION

The following description is directed to scintillation detection devices, and particularly, to scintillation detection devices having encapsulated scintillator crystals. For example, the scintillation detection devices of embodiments herein can be used in downhole exploration and well logging. In another embodiment, such a scintillation detection device can be used as a port-of-entry security apparatus.

The description discloses the use of a polymer film that can be disposed as a fixed polymer layer between various subcomponents of a sonde. The polymer film can include a pressure sensitive adhesive film. In a particular aspect, the pressure sensitive adhesive film can be clear, and the clear pressure sensitive adhesive film can be used as an optical interface between a photosensor and a light pipe and between a scintillation device and a light pipe. Further, within the scintillation device, the clear pressure sensitive adhesive film can be used as an interface between a scintillator and a window. The pressure sensitive adhesive film can adhere adjacent components between which the pressure sensitive adhesive film is disposed.

The sonde can be generally tubular and can be reeled down a hole in order to detect gamma rays. The use of the sonde in such a manner makes it possible to analyze rock strata as gamma rays are emitted from naturally occurring radioisotopes, typically of shales that surround hydrocarbon reservoirs. Various features of a well logging system, a sonde, and scintillation detection devices are described in more detail herein.

According to a one aspect, a sonde is disclosed that includes a scintillator material such as, a scintillator crystal. The scintillator material can be sensitive to particular types of radiation, for example, gamma rays, such that when the material is struck by a particular type of radiation, the scintillator responds by fluorescing or scintillating electromagnetic radiation at a particular wavelength. The fluoresced radiation can be captured and recorded by a photosensor, such as a photomultiplier tube or photodiode, which converts the fluoresced radiation to an electrical signal for processing. As such, the detector can provide a user with the ability to detect and record radiation events, which in the context of well logging applications, can enable users to determine the composition rock strata surrounding a borehole.

Figure 1:
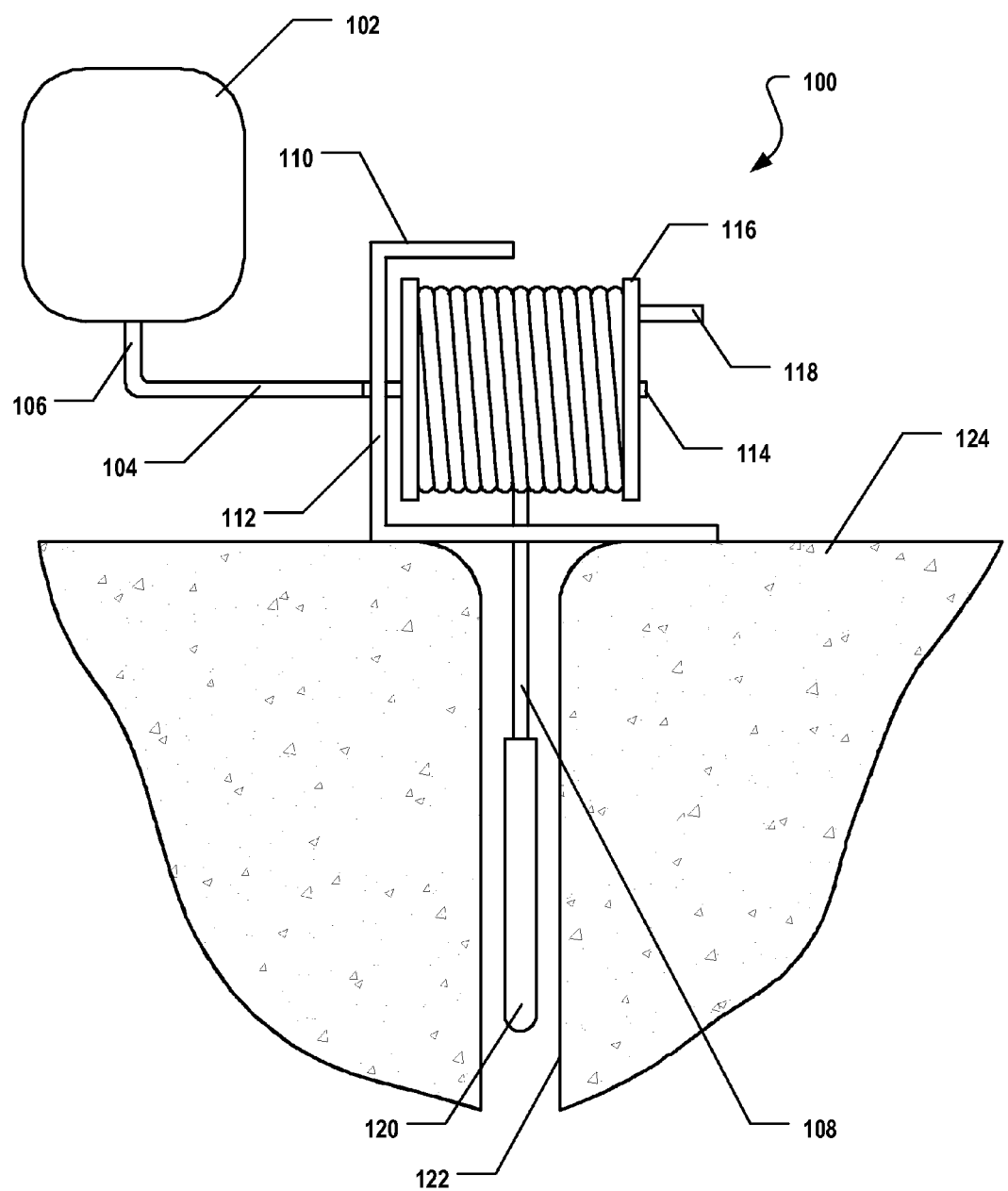
FIG. 1 includes a diagram of a well logging system in accordance with an embodiment.

Referring initially to FIG. 1, a well logging system is shown and is generally designated 100. As shown, the well logging system 100 can include a control panel 102. Further, the well logging system 100 can include a signal cord 104 having a proximal end 106 and a distal end 108. As shown the proximal end 106 of the signal cord 104 can be connected to the control panel 102.

FIG. 1 indicates that the well logging system 100 can also include a spool assembly 110. The spool assembly 110 can include a stand 112. The stand 112 can include an axle 114 attached to the stand 112. Moreover, the spool assembly 110 can include a spool 116 installed on the axle 114. In a particular, the spool 116 can rotate within the stand 112 on the axle 114. Also, the spool 116 can include a handle 118 attached thereto. The handle 118 can allow a user to manually rotate the spool 116 within the stand 112.

As depicted in FIG. 1, a portion of the signal cord 104 can be wrapped around the spool 116. Accordingly, a user can rotate the spool 116 in a first direction in order to unwind the signal cord 104 from the spool 116, and the user can rotate the spool 116 in a second direction, opposite the first direction, in order to wind the signal cord 104 onto the spool 116.

FIG. 1 further illustrates that a sonde 120 can be connected to the distal end 108 of the signal cord 104. In general, the sonde 120 can be considered a probe that can include certain detection devices and associated electronics for exploring regions and environments that are unsuitable for humans. One such application can include exploratory drilling or well-logging applications in which a hole 122 can be drilled within the crust 124 of the earth in order to explore and characterize rock structures below the surface. Particular sondes and components that may be installed in such sondes are described below in conjunction with FIG. 2 through FIG. 6.

Figure 2:
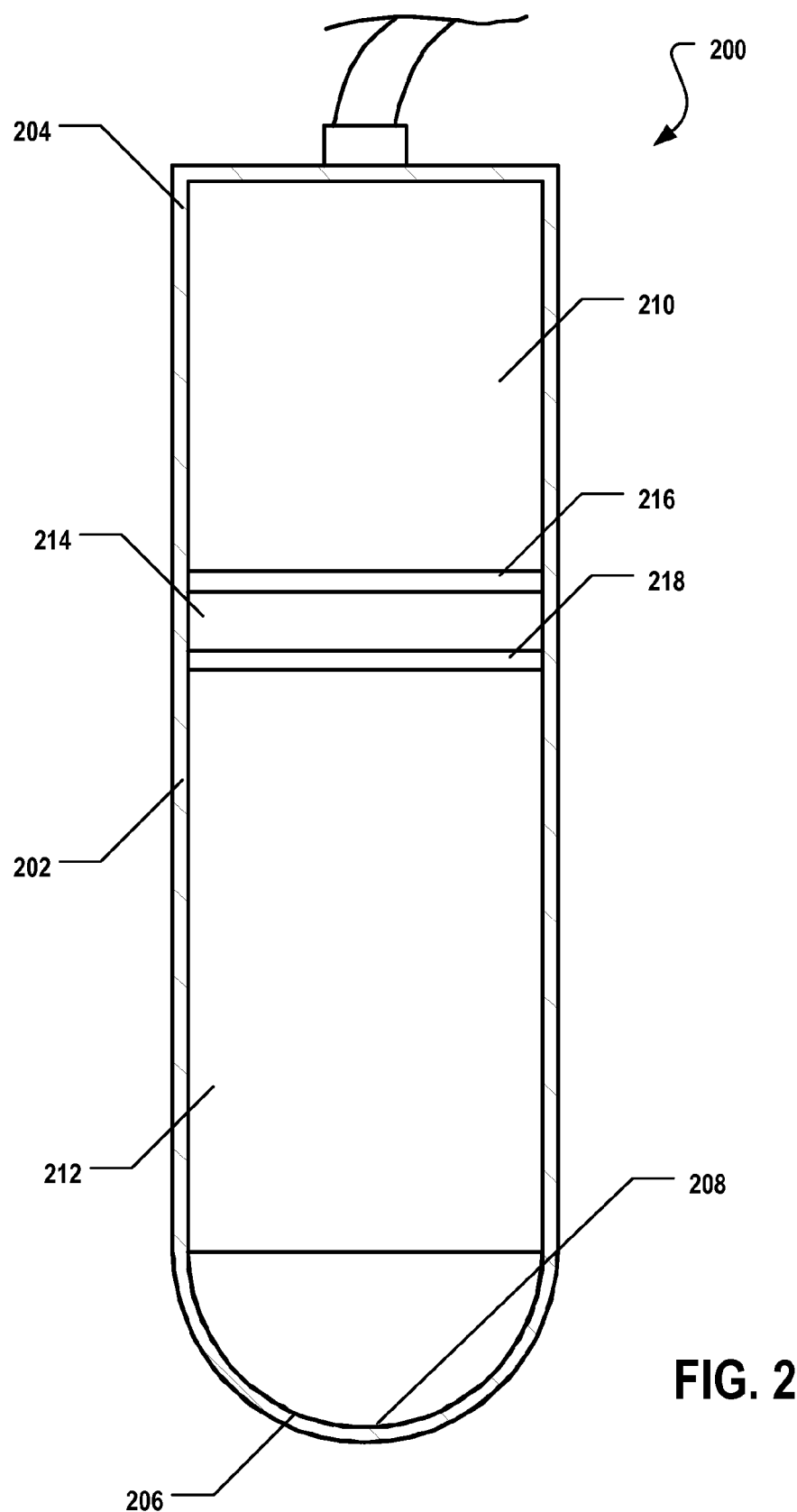
FIG. 2 includes a partial cross-sectional illustration of an embodiment of a sonde in accordance with an embodiment.

FIG. 2 depicts an embodiment of a sonde, designated 200, that may be used in conjunction with the well logging system 100, described above in conjunction with FIG. 1. As depicted in FIG. 2, the sonde 200 can include a housing 202 having a proximal end 204 and a distal end 206. Further, the housing 202 can include an interior cavity 208. A photosensor 210 can be installed within the interior cavity 208 of the housing 202 at or near the proximal end 204 of the housing 202. A scintillation device 212 can be installed within the interior cavity 208 of the housing 202 at or near the distal end 206 of the housing 202. Moreover, as depicted in FIG. 2, a light pipe 214 can be installed within the interior cavity 208 of the housing 202 between the photosensor 210 and the scintillation device 212.

In a particular aspect, the photosensor 210 can be adhered, or otherwise coupled, to the light pipe 214 via a first polymer layer 216. Additionally, the scintillation device 212 can be coupled to the light pipe 214 via a second polymer layer 218. In a particular embodiment, each polymer layer 216, 218 can be a pressure sensitive adhesive layer. Further, each polymer layer 216, 218 can be formed from a pressure sensitive adhesive film, described in greater detail below.

In a particular aspect, an initial viscosity of the polymer material comprising the polymer layers 216, 218, can substantially reduce the polymer layers 216, 218 from being squeezed out from the space in which the polymer layers 216, 218 are installed between adjacent components during assembly. In one embodiment, the viscosity at 25° C. can be at least about 10,000 Pa·S. For example, the viscosity at 25° C. can be at least about 15,000 Pa·S, at least about 20,000 Pa·S, at least about 25,000 Pa·S, at least about 30,000 Pa·S, or even at least about 35,000 Pa·S. In another aspect, the viscosity at 25° C. may not be greater than about 100,000 Pa·S, not greater than about 75,000 Pa·S, not greater than about 50,000 Pa·S, not greater than about 45,000 Pa·S, or not greater than about 40,000 Pa·S. In another aspect, the viscosity at 25° C. can be within a range including any of the minimum and maximum values noted above.

In another aspect, the polymer material comprising the polymer layers 216, 218 can have a durometer on a Shore "00" scale of at least about 20. For example, the durometer can be at least about 25, at least about 30, or even at least about 35. In another aspect, the durometer is not greater than about 60, not greater than about 55, not greater than about 50, or not greater than about 45. In another aspect, the durometer can be within a range including any of the minimum and maximum values noted above.

In another aspect, in order to improve the sensitivity of the device in which the polymer layers 216, 218 are installed, the density of the material comprising the polymer layers 216, 218 can be less than about 1.5 g/cm$^3$. Further, the density can be less than about 1.25 g/cm$^3$, such as less than about 1.20 g/cm$^3$, less than about 1.15 g/cm$^3$, less than about 1.10 g/cm$^3$, less than about 1.08 g/cm$^3$, less than about 1.05 g/cm$^3$, less than about 1.03 g/cm$^3$, or less than about 1.0 g/cm$^3$.

In still another aspect, each polymer layer 216, 218 can have a thickness of at least about 25 micrometers, such as at least about 50 micrometers, at least about 75 micrometers, at least about 100 micrometers, or at least about 125 micrometers. Further, the thickness may be not greater than about 250 micrometers, not greater than about 225 micrometers, not greater than about 200 micrometers, not greater than about 175 micrometers, or not greater than about 150 micrometers. In another aspect, the thickness can be within a range including any of the minimum and maximum values not above.

In one aspect, the thickness of each polymer layer 216, 218 can be substantially the same. Alternatively, the thickness of the first polymer layer 216 may be different from the thickness of the second polymer layer 218. Further, each polymer layer 216, 218 can be substantially incompressible such that a post-installation thickness of each polymer layer 216, 218 after being sandwiched between two components is substantially the same as a pre-installation thickness of each polymer layer 216, 218. Further, each polymer layer 216, 218 can include carbon along the backbone of the polymer.

Returning to the description of FIG. 2, the photosensor 210 can be coupled to the control panel 102 (FIG. 1) that includes the appropriate electronics adapted to count photons received at the photosensor 210 based on electrical pulses output by the photosensor 210. The electronics within the control panel 102 (FIG. 1), the photosensor 210, or a combination thereof can include one or more electronic devices, such as an amplifier, a pre-amplifier, a discriminator, an analog-to-digital signal converter, a photon counter, another electronic device, or any combination thereof.

In one embodiment, the photosensor 210 can include a device capable of spectral detection and resolution. For example, the photosensor 210 can include a conventional photomultiplier tube (PMT), a photodiode, or a hybrid photosensor. The photosensor 210 is adapted to receive photons emitted by the scintillation device 212, and the photosensor 210 produces electrical pulses from photons that it receives. The electrical pulses can be shaped and digitized by associated electronics to provide a count of the photons received at the photosensor 210. The photosensor 210 can be housed within a tube or housing made of a material capable of protecting electronics associated with the photosensor 210, such as a metal, metal alloy, other material, or any combination thereof.

As illustrated, the light pipe 214 can be disposed between the photosensor 210 and the scintillation device 212. The light pipe 214 can facilitate optical coupling between the photosensor 210 and the scintillation device 212. The light pipe 214 can include a quartz light pipe, plastic light pipe, or another light pipe. In some embodiments, multiple light pipes can be disposed between the photosensor 210 and the scintillation device 212.

Figure 3:
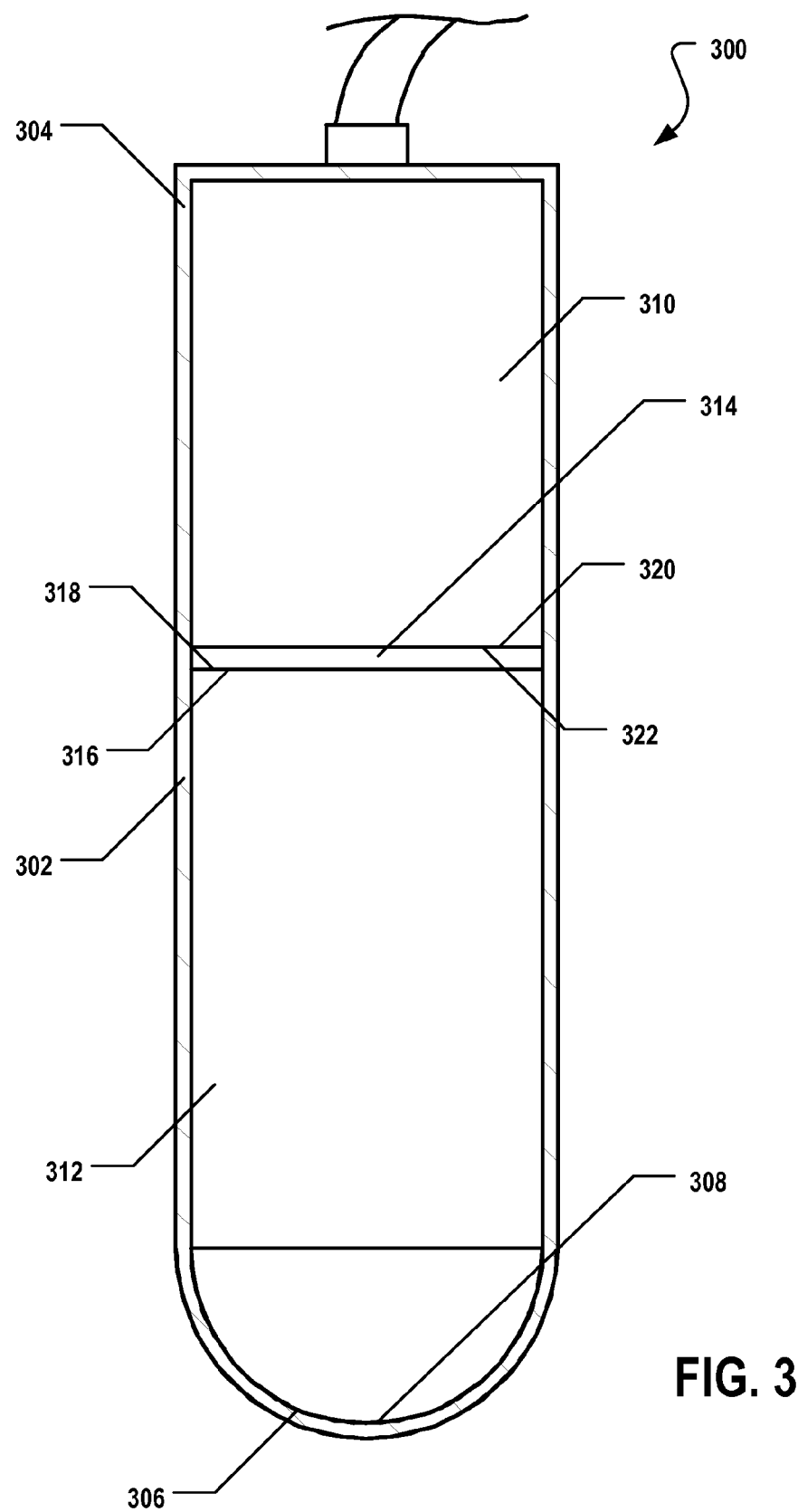
FIG. 3 includes a partial cross-sectional illustration of another embodiment of a sonde in accordance with an embodiment.

FIG. 3 depicts another embodiment of a sonde, designated 300, that may be used in conjunction with the well logging system 100, described above in conjunction with FIG. 1. As depicted in FIG. 3, the sonde 300 can include a housing 302 having a proximal end 304 and a distal end 306. Further, the housing 302 can include an interior cavity 308. A photosensor 310 can be installed within the interior cavity 308 of the housing 302 at or near the proximal end 304 of the housing 302. A scintillation device 312 can be installed within the interior cavity 308 of the housing 302 at or near the distal end 306 of the housing 302.

In a particular aspect, the photosensor 310 can be adhered, or otherwise coupled, directly to the scintillation device 312 via a polymer layer 314. In particular, a first side 316 of the polymer layer 314 can be bonded, or otherwise affixed, to a window exit face 318 of the scintillation device 312 and a second side 320 of the polymer layer 314 can be bonded to a window entry face 322 of the photosensor 310.

In a particular embodiment, the polymer layer 314 can be a pressure sensitive adhesive layer. Further, the polymer layer 314 can be formed from a pressure sensitive adhesive film, described in greater detail below and can have the same properties of the other polymer layers described herein.

As illustrated in FIG. 3, the photosensor 310 can be coupled to the control panel 102 (FIG. 1) that includes the appropriate electronics adapted to count photons received at the photosensor 210 based on electrical pulses output by the photosensor 310. The photosensor 310 can be configured similar to the other photosensors 310 described herein.

Figure 4:
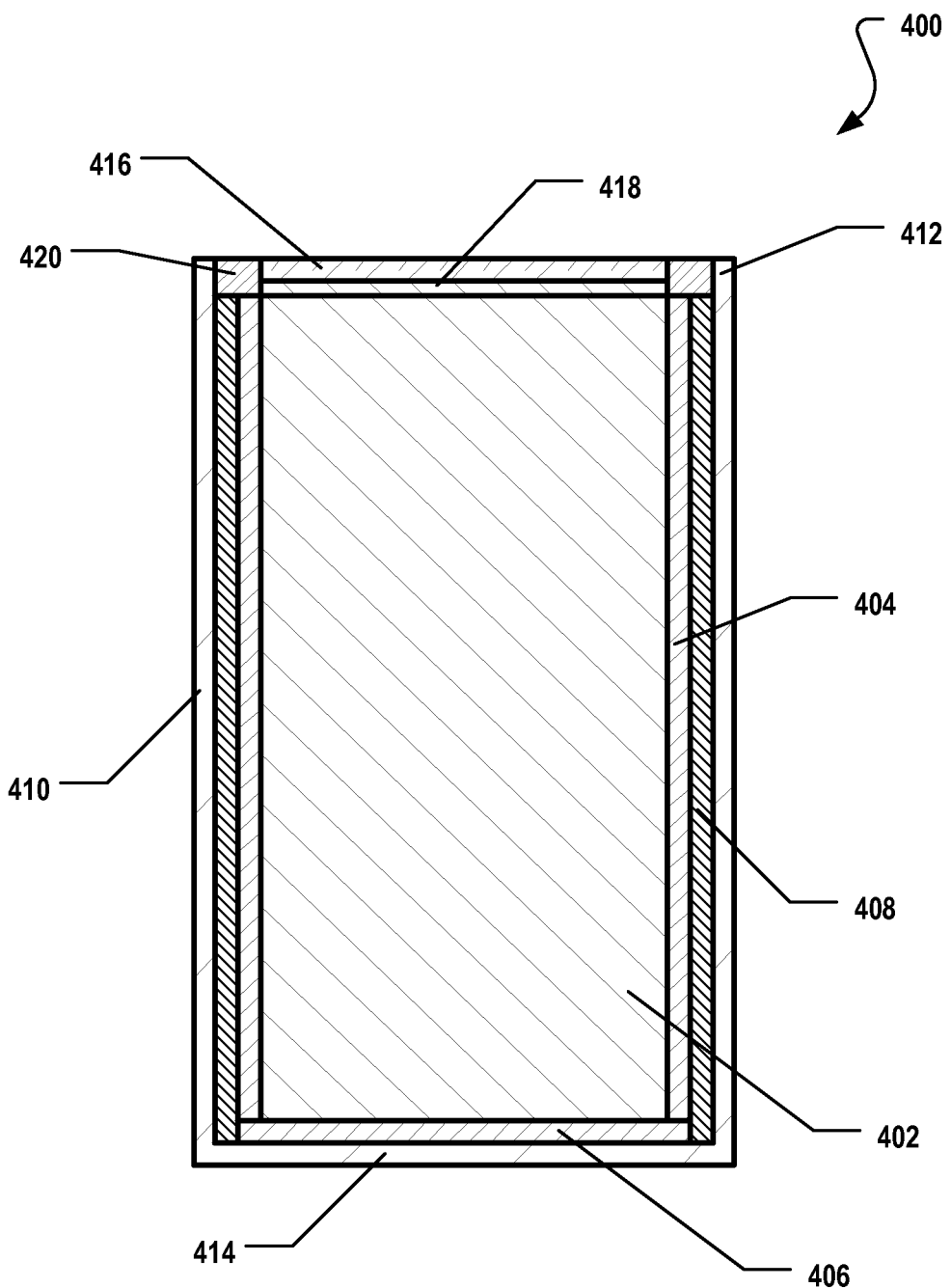
FIG. 4 includes a cross-sectional illustration of an embodiment of a scintillation device in accordance with an embodiment.

Referring now to FIG. 4, details concerning an embodiment of a scintillation device 400 are depicted. In a particular aspect, the scintillation device 400 may be installed in the sondes 200, 300, described above in conjunction with FIG. 2 and FIG. 3. As illustrated, the scintillation device 400 can include a scintillator 402. A first reflector 404 can at least partially surround the scintillator 402. For example, the first reflector 404 can be disposed around an outer periphery of the scintillator 402. Further, a second reflector 406 can be placed at or near an end of the scintillator 402.

The scintillator 402 can include a scintillator material. In accordance with an embodiment, the scintillator material can be a material selected from the group of materials including inorganic materials, organic materials, and a combination thereof. In more particular instances, the scintillator material can be formed of inorganic materials including, for example, halides, oxides, and a combination thereof. In one particular instance, the scintillator material can be a crystalline, inorganic material. In fact, certain crystalline, inorganic materials can include rare-earth elements. Moreover, such inorganic materials can have a hexagonal crystal structure.

Embodiments herein can utilize a detector incorporating a scintillator material made of a crystalline inorganic material, such as CsF, NaI, LaCl$_3$, LaBr$_3$, BGO (e.g., Bi$_4$Ge$_3$O$_{12}$), CaF$_2$, LYSO (e.g., Lu$_{1.8}$Y$_{0.2}$SiO$_5$), LSO (e.g., Lu$_2$SiO$_5$), CsI, LuI$_3$, GSO (e.g., Gd$_2$SiO$_5$), CLYC (e.g., Cs$_2$LiYCl$_6$), CNLI (e.g., Cs$_2$NaLaI$_6$), CLLB (e.g., Cs$_2$LiLaBr$_6$), LuAO (e.g., LuAlO$_3$), LuYAO (e.g., Lu$_x$Y$_{1-x}$AlO$_3$), LuAO (e.g., Lu$_3$Al$_5$O$_{12}$), Lu$_2$Si$_2$O$_7$, GdI$_3$, SrI$_2$, LGSO (e.g., Lu$_{1.8}$Gd$_{0.2}$SiO$_5$) GYSO (e.g., GdYSiO$_5$), LGYSO and combinations thereof. In a particular aspect, the foregoing crystalline, inorganic materials can include dopants, which can be present as elemental species in minor amounts within the compound.

In other embodiments, the scintillator material can include an organic material. For example, suitable organic materials can include polymer materials. The scintillator can include an organic material such as a plastic. In certain embodiments, the organic material can include cyclic compounds having pi-orbital electrons. In one particular embodiment, the organic material can include aromatic compounds having pi-orbital electrons arranged in a planar structure and having aromatic properties in accordance with the Hueckel rule.

Specific examples of organic scintillators include crystalline anthracene, polystyrene (PS), polyvinyl toluene (PVT), naphthalene doped acrylic, or any combination thereof. For example, suitable scintillators for use in the present invention include anthracene-doped Polyvinyl toluene, Polystyrene, or poly(methyl)methacrylate (PMMA) based scintillators. In yet another embodiment, scintillators can include scintillating fibers with a polystyrene-based or polyvinyl toluene-based core and a poly(methyl)methacrylate-based cladding. In another particular embodiment, an additional cladding may be used, such as a fluoropolymer.

In certain instances, the scintillator material can incorporate a combination of inorganic and organic materials, such as any of the organic materials utilized above in combination with a polymer material. Further, the scintillator material may be hygroscopic. In another aspect, the scintillator material can be a ceramic material.

In one embodiment, the first reflector 404, the second reflector 406, or a combination thereof can be substantially surrounded by a liner (not illustrated) disposed around or on an outer surface of each reflector 404, 406, which can include a metal material, particularly a thin metal liner such as a foil. In accordance with a particular embodiment, the coating material can include aluminum foil. In other embodiments, the reflector 404, 406 can consist essentially of the liner, such that each reflector 404, 406 is a thin metal foil.

In accordance with a particular embodiment, the reflectors 404, 406 can be a preformed sheet containing a polymer material. Some suitable polymer materials can include fluorinated polymers. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylene, ethylene-chlorotrifluoroethylene, and mixtures of such fluoropolymers. In one particular embodiment, each reflector 404, 406 can consist essentially of a fluorinated polymer. In a more particular embodiment, each reflector 404, 406 can be made mostly, or entirely, of polytetrafluoroethylene (PTFE).

Still referring to FIG. 4, the scintillation device 400 can further include a shock absorbing member 408 that can at least partially surround the first reflector 404 and the elements within the first reflector 404, e.g., the scintillator 402. The shock absorbing member 408 can be generally cylindrical and can be made from a polymeric material. A housing 410 having an open end 412 and a closed end 414 can surround the shock absorbing member 408. In a particular aspect, the shock absorbing member 408 can protect the elements within the shock absorbing member 408 from impacting the housing 410. Further, the shock absorbing member 408 can substantially reduce vibration within the housing 410.

FIG. 4 shows that a window 416 can be affixed, or otherwise attached, to an end of the scintillator 402 nearest to the open end 412 of the housing 410. The window 416 can be attached to the end of the scintillator 402 via a polymer layer 418. Further, an end seal 420, or end cap, can fit into the open end 412 of the housing 410 around the window 416.

In a particular aspect, in addition to attaching the window 416 to the scintillator 402, the polymer layer 418 can provide an optical interface between the scintillator 402 and the window 416. In one aspect, the polymer layer 418 can be a pressure sensitive adhesive layer. Further, the polymer layer 418 can be formed from a pressure sensitive adhesive film, described in greater detail below. Also, the polymer layer 418 can have the same characteristics as the other polymer layers, described herein.

In another aspect, the end seal 420 can provide a water tight seal at the open end 412 of the housing 410 and can substantially protect the scintillator 402 from water infiltration if a sonde in which the scintillation device 400 is installed is used in an aqueous environment in which water, or water vapor, is present.

Figure 5A:
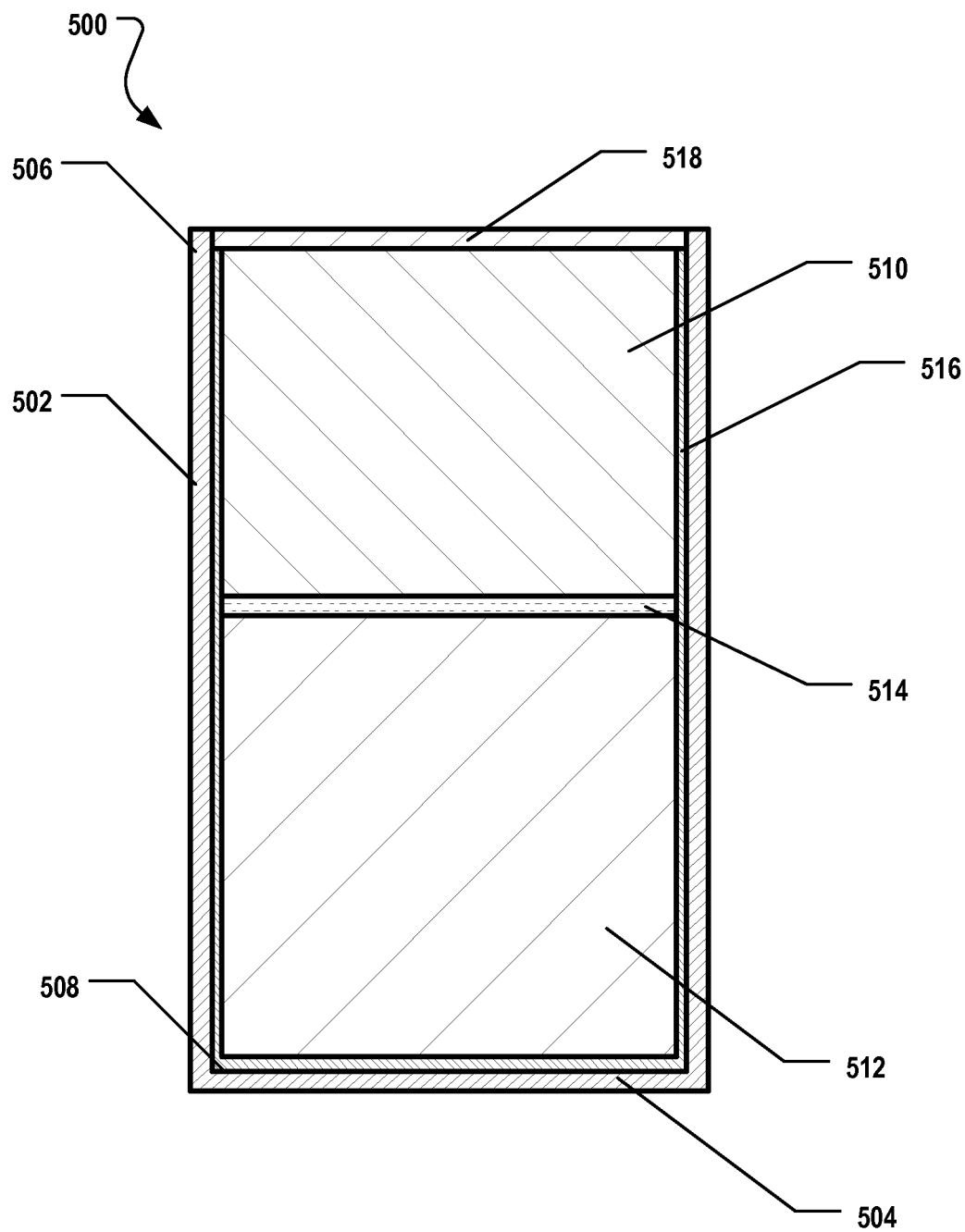
FIG. 5A includes a cross-sectional illustration of an embodiment of a detector device in accordance with an embodiment.

Referring to FIG. 5A, a detector device is shown and is generally designated 500. As depicted in FIG. 5A, the detector device 500 can include a housing 502 having a closed end 504 and an open end 506. Further, the housing 502 can include an interior cavity 508. A photosensor 510 can be installed within the interior cavity 508 of the housing 502 at or near the open end 504 of the housing 502. A scintillator 512 can be installed within the interior cavity 508 of the housing 502 at or near the closed end 504 of the housing 502. In a particular aspect, the scintillator 512 can include a scintillator material, e.g., one or more of the scintillator materials described herein.

In a particular aspect, the photosensor 510 can be adhered, or otherwise coupled, directly to the scintillator 512 via a polymer layer 514. In a particular embodiment, the polymer layer 514 can be a pressure sensitive adhesive layer. Further, the polymer layer 514 can be formed from a pressure sensitive adhesive film, described in greater detail below and can have the same properties of the other polymer layers described herein.

As illustrated in FIG. 5A, the assembly including the photosensor 510 and the scintillator 512 can be surrounded by a reflector 516. The reflector 516 can be constructed from the same materials as the other reflectors, described herein. Moreover, an end cap 518 may hermetically seal the housing 502.

In a particular aspect, the scintillator 512 may be made from a water sensitive scintillator material, e.g., NaI. In this aspect, the photosensor 510 can be a photomultiplier tube (PMT), an avalanche photodiode (APD), or a silicon photomultiplier (SiPM). Further, in this aspect, the housing 502 should be hermetically sealed.

In another aspect, the scintillator 512 may be made from a non-hygroscopic material, e.g., LYSO. In this aspect, the assembly of the photosensor 510 and the scintillator 512 may not need to be hermetically sealed and the assembly of the photosensor 510 and the scintillator 512 can be made light tight only, e.g., using the reflector 516. In such an embodiment, the housing 502 may be eliminated from the assembly of the detector device 500.

In a particular aspect, the detector device 500 can be a stand-alone detector device that can be connected to the appropriate electronics, described herein, and can be used for radiation detection as part of a port-of-entry detector. In another aspect, the detector device 500 may be installed within an additional housing, similar to the housings 202, 302, described in conjunction with FIG. 2 and FIG. 3, and the detection device 500 may be used as part of a sonde.

Figure 5B:
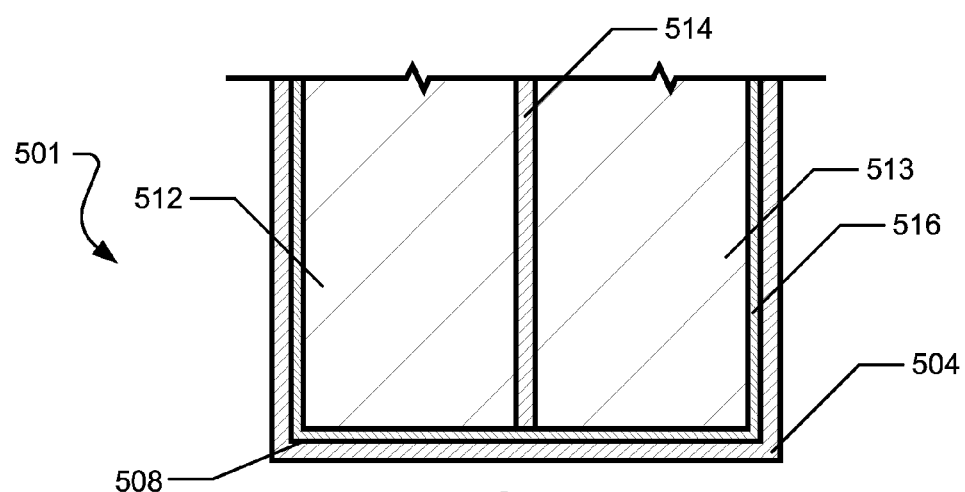
FIG. 5B includes a cross-sectional illustration of an embodiment of a scintillation assembly in accordance with an embodiment.

Referring to FIG. 5B, a scintillation assembly is shown and is generally designated 501. As depicted in FIG. 5B, the scintillation assembly can include a housing 502 having a closed end 504 and an open end 506. Further, the housing 502 can include an interior cavity 508. A plurality of scintillators 512, 513 can be disposed within the interior cavity 508 of the housing 502 at or near the closed end 504 of the housing 502. In a particular aspect, the plurality of scintillators 512, 513 can include a scintillator material, e.g., one or more of the scintillator materials described herein.

In a particular aspect, as illustrated in FIG. 5B, a polymer layer 514 can be disposed between at least two of the plurality of scintillators 512, 513. In certain embodiments, the plurality of scintillators 512, 513 be adhered, or otherwise coupled, to each other via the polymer layer 514. In a particular embodiment, the polymer layer 514 can be a pressure sensitive adhesive layer. Further, the polymer layer 514 can be formed from a pressure sensitive adhesive film, described in greater detail below and can have the same properties of the other polymer layers described herein.

In certain embodiments, the polymer layer 514 can extend at least 10%, at least 20%, at least 25%, at least 35%, at least 50%, at least 75%, at least 90%, or substantially all of a side of the scintillator 512 between the other scintillator 513.

Figure 5C:
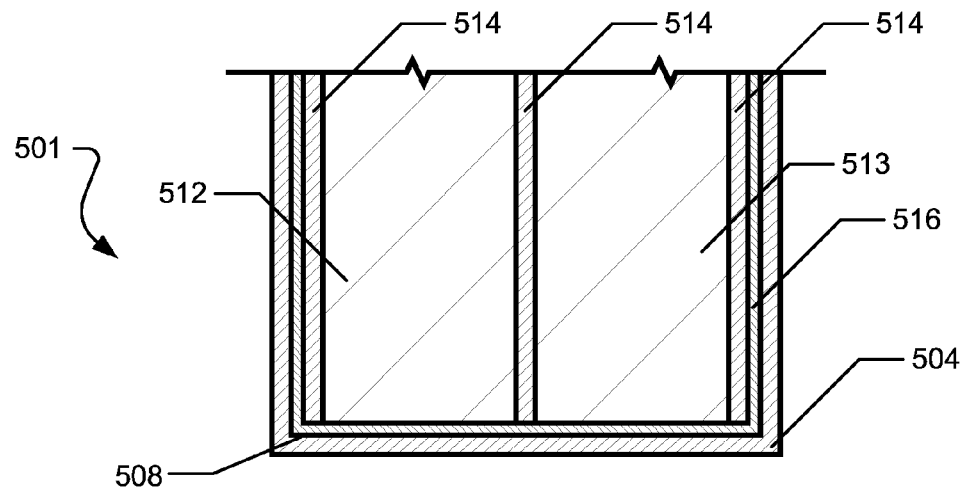
FIG. 5C includes a cross-sectional illustration of an embodiment of a scintillation assembly in accordance with an embodiment.
Figure 5D:
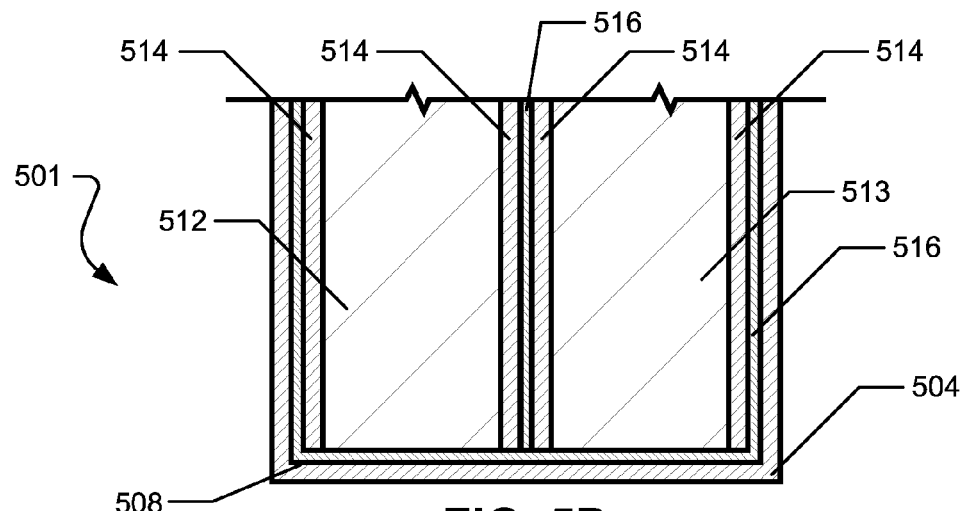
FIG. 5D includes a cross-sectional illustration of an embodiment of a scintillation assembly in accordance with an embodiment.

In another aspect, as illustrated in FIG. 5C, at least two of the plurality of scintillators 512, 513 can be adhered, or otherwise coupled, to a reflector 516 via a polymer layer 514. The reflective material can surround the plurality of scintillators as illustrated in FIG. 5C. In other aspects, the reflective material can be disposed between the plurality of scintillators as illustrated in FIG. 5D. The reflector 516 can be adhered or otherwise coupled to at least two of the plurality of scintillators 512, 513 via the polymer layer 514 between the plurality of scintillators 512, 513.

In a particular aspect, the scintillation assembly 501 can be included in a detector assembly such as depicted in FIG. 5A. The scintillation assembly 501 can be included in a stand-alone detector device that can be connected to the appropriate electronics, described herein, and can be used for radiation detection as part of a port-of-entry detector. In another aspect, the scintillation assembly 501 may be installed within an additional housing, similar to the housings 202, 302, described in conjunction with FIG. 2 and FIG. 3, and the scintillation assembly 501 may be used as part of a sonde.

Figure 6:
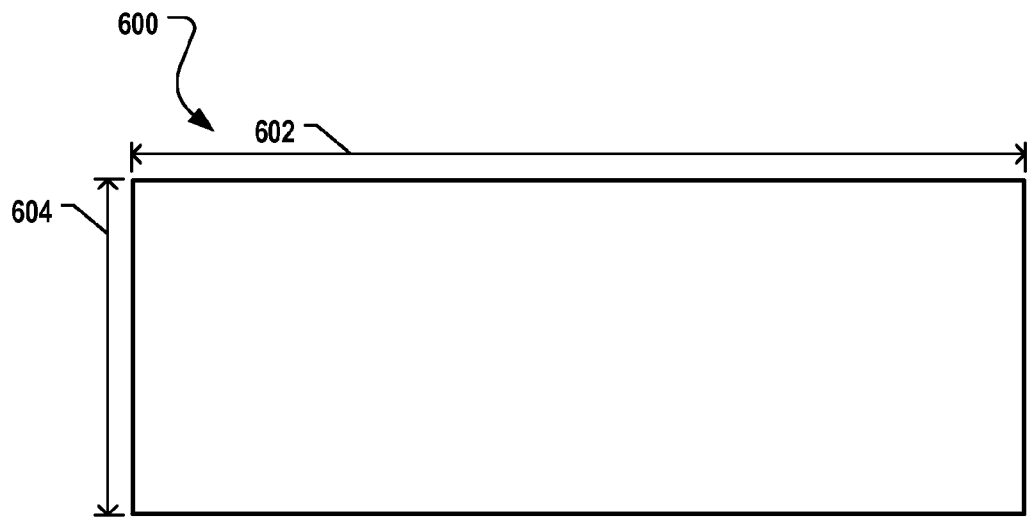
FIG. 6 includes a top plan illustration of a scintillator assembly.
Figure 7:
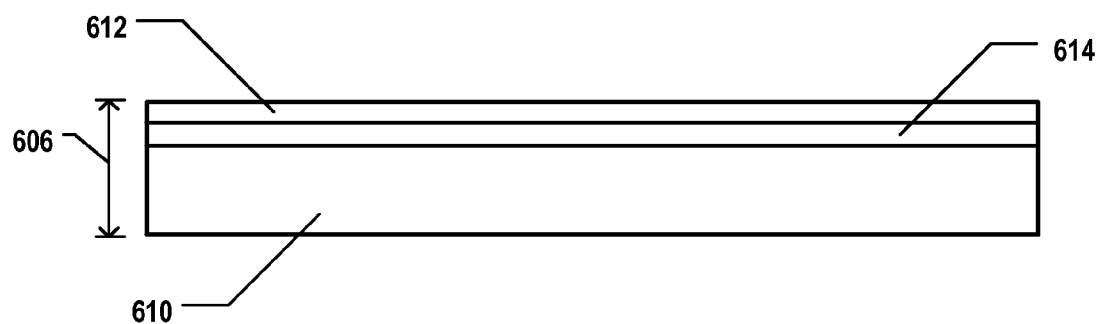
FIG. 7 includes a side plan illustration of a scintillator assembly.

FIG. 6 and FIG. 7 illustrate an embodiment of a scintillator assembly, generally designated 600. As depicted, the scintillator assembly 600 can include a length 602, a width 604, and a height 606. Further, the scintillator assembly 600 can include a substrate 610 to which a scintillator layer 612 can be affixed, or otherwise attached, using a polymer layer 614.

In a particular aspect, a length-to-width ratio can be at least about 1.0:1.0. In another aspect, the length-to-width ratio can be at least about 1.5:1.0, at least about 2.0:1.0, at least about 2.2:1.0, at least about 2.4:1.0, at least about 2.6:1.0, or at least about 2.8:1. In another aspect, the length-to-width ratio can be not greater than about 5.0:1, not greater than about 4.5:1, or not greater than about 4.0:1. Further, the length-to-width ratio can be within a range between and including any of the length-to-width ratio values described herein.

In another particular aspect, a length-to-thickness ratio can be at least about 5.0:1.0. In another aspect, the length-to-thickness ratio can be at least about 5.5:1.0, at least about 6.0:1.0, at least about 6.5:1.0, at least about 7.5:1.0, at least about 9.0:1.0, or at least about 10.2:1. In another aspect, the length-to-thickness ratio can be not greater than about 15.0:1, not greater than about 14.5:1, or not greater than about 14.0:1. Further, the length-to-thickness ratio can be within a range between and including any of the length-to-thickness ratio values described herein.

The substrate 600 of the scintillator assembly can comprise a transparent material. For example, the substrate 610 can include a transparent plastic material, such as clear acrylic. Specifically, the substrate 610 can include BC-802 Premium UVA Acrylic Plastic sold by Saint-Gobain.

Further, the scintillator layer 612 can include any of the scintillator materials described herein. In particular, the scintillator layer 612 can include any of the scintillator plastics described herein. For example, the scintillator layer 612 can include a mixture of polyvinyl toluene and organic fluors. In such an embodiment, the polyvinyl toluene is present in an amount greater than 97% wt and the organic fluors are present in an amount less than 3% wt. Specifically, the scintillator layer 612 can include B-400 polyvinyl toluene and organic fluors sold by Saint-Gobain.

The polymer layer 614 coupling the scintillator layer 612 to the substrate 610 is configured to account for different thermal expansion rates of the scintillator layer 612 and the substrate 610. Further, the polymer layer 614 is configured to substantially reduce the formation of micro-cracks in the scintillator layer 612 due to thermal expansion/contraction of the substrate 610.

The polymer layer 614 is configured to substantially reduce the formation of cracks over a temperature difference of at least about 10° C. Further, the temperature difference can be at least about 15° C., at least about 20° C., at least about 25° C., or at least about 30° C. In another aspect, the temperature difference may be not greater than about 55° C., not greater than about 50° C., not greater than about 45° C., or not greater than about 40° C.

In another aspect, the polymer layer 614 is configured to substantially reduce the formation of cracks over a temperature range of about 0° C. to about 55° C. Moreover, the polymer layer 614 is configured to substantially reduce the formation of cracks over a temperature range of about 5° C. to about 55° C., a temperature range of about 10° C. to about 55° C., a temperature range of about 15° C. to about 55° C., a temperature range of about 20° C. to about 55° C., or a temperature range of about 25° C. to about 55° C.

In a particular aspect, the polymer layer 614 can mechanically couple the scintillator layer 612 to the substrate 610. Further, the polymer layer 614 can optically couple the scintillator layer 612 to the substrate 610. In particular, the polymer layer 614 can include an optically clear laminating adhesive. For example, the polymer layer 614 can include the pressure sensitive adhesive film described herein. The polymer layer 614 can include a single layer of film, two stacked layers of film, or any number of multiple stacked layers. In a particular aspect, the substrate 610 can be an optically clear substrate and the substrate 610 can serve as a light guide or a light pipe.

In another aspect, the substrate thickness can be at least about 6.35 millimeters (0.25 inches). Further, the substrate thickness can be at least about 12.7 millimeters (0.5 inches), at least about 19.05 millimeters (0.75 inches), at least about 25.4 millimeters (1.0 inches), at least about 31.75 millimeters (1.25 inches), at least about 38.1 millimeters (1.5 inches), or at least about 50.8 millimeters (2.0 inches). Moreover, the substrate thickness may not be greater than about 101.6 millimeters (4.0 inches), not greater than about 88.9 millimeters (3.5 inches), or not greater than about 76.3 millimeters (3.0 inches). Also, the substrate thickness can be within a range between and including any of the substrate thicknesses described herein.

In yet another aspect, the scintillator layer thickness can be at least about 0.0762 millimeters (0.003 inches). Further, the scintillator layer thickness can be at least about 0.1 millimeters (0.0039 inches), at least about 0.25 millimeters (0.0098 inches), at least about 0.5 millimeters (0.0197 inches), at least about 0.75 millimeters (0.0295 inches), at least about 1.0 millimeters (0.0394 inches), at least about 1.25 millimeters (0.0492 inches), or at least about 1.5 millimeters (0.0591 inches). Moreover, the scintillator thickness may not be greater than about 5.0 millimeters (0.1969 inches), not greater than about 4.5 millimeters (0.1772 inches), or not greater than about 4.0 millimeters (0.1575 inches). Also, the scintillator layer thickness can be within a range between and including any of the substrate thicknesses described herein.

In yet another aspect, the adhesive layer thickness can be at least about 0.0254 millimeters (0.001 inches). Further, the scintillator layer thickness can be at least about 0.0381 millimeters (0.0015 inches), at least about 0.0508 millimeters (0.002 inches), at least about 0.0635 millimeters (0.0025 inches), or at least about 0.0762 millimeters (0.003 inches). Moreover, the adhesive layer thickness may not be greater than about 0.127 millimeters (0.005 inches), not greater than about 0.1143 millimeters (0.0045 inches), or not greater than about 0.1016 millimeters (0.004 inches). Also, the adhesive layer thickness can be within a range between and including any of the substrate thicknesses described herein.

In another aspect, a scintillator layer thickness-to-adhesive layer thickness ratio can be at least about 0.5:1.0. In another aspect, the scintillator layer thickness-to-adhesive layer thickness ratio can be at least about 1.0:1.0, at least about 5.0:1.0, at least about 10.0:1.0, at least about 50.0:1.0, or at least about 100.0:1.0. Further, the scintillator layer thickness-to-adhesive layer thickness ratio may be not greater than about 200.0:1.0, not greater than about 175.0:1.0, or not greater than about 150.0:1.0. The scintillator layer thickness-to-adhesive layer thickness ratio can be within a range between and including any of the scintillator layer thickness-to-adhesive layer thickness ratios described herein.

In still another aspect, a substrate thickness-to-adhesive layer thickness ratio can be at least about 50.0:1.0. In another aspect, the substrate thickness-to-adhesive layer thickness ratio can be at least about 100.0:1.0, at least about 250.0:1.0, at least about 500.0:1.0, at least about 750.0:1.0, or at least about 1000.0:1.0. Further, the substrate thickness-to-adhesive layer thickness ratio may be not greater than about 4000.0:1.0, not greater than about 3500.0:1.0, not greater than about 3000.0:1.0, or not greater than about 2500.0:1.0. The substrate thickness-to-adhesive layer thickness ratio can be within a range between and including any of the substrate thickness-to-adhesive layer thickness ratios described herein.

In yet another aspect, the substrate thickness-to-scintillator layer thickness ratio can be at least about 1.25:1.0. Further, the substrate thickness-to-scintillator layer thickness ratio can be at least about 1.5:1.0, at least about 5.0:1.0, at least about 10.0:1.0, at least about 25.0:1.0, at least about 50.0:1.0, at least about 100.0:1.0, or at least about 200.0:1.0. In another aspect, the substrate thickness-to-scintillator layer thickness ratio may be no greater than about 1500.0:1.0, no greater than about 1400.0:1.0, no greater than about 1300.0:1, or no greater than about 1000.0:1.0. The substrate thickness-to-scintillator layer thickness ratio can be within a range between and including any of the substrate thickness-to-scintillator layer thickness ratios described herein.

Figure 8:
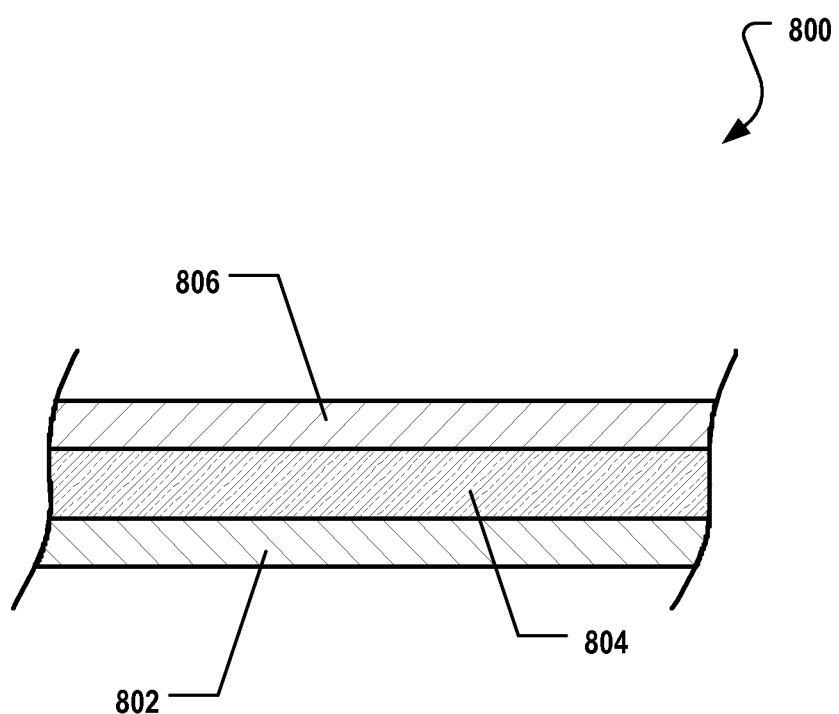
FIG. 8 includes a cross-sectional illustration of a pressure sensitive adhesive assembly.

Referring now to FIG. 8, a generally flat polymer assembly is illustrated. In a particular embodiment, the polymer assembly may be a pressure sensitive adhesive assembly, generally designated 800. As illustrated, the pressure sensitive adhesive assembly 800 can include a first release liner 802. A polymer film, e.g., a pressure sensitive adhesive film 804 can be disposed on the first release liner 802, and a second release liner 806 can be disposed on the pressure sensitive adhesive film 804. In a particular aspect, the release liners 802, 806 can be made from a polyester material. For example, the polyester material can include polyethylene terephthalate (PET). More particularly, the polyester material can include siliconized PET. The siliconized PET can include a layer of PET that is coated with a silicone layer.

In a particular embodiment, after the pressure sensitive adhesive assembly 800 is assembled as depicted in FIG. 8, a layer of silicone on each release liner 806 can be immediately adjacent to, and touching, the pressure sensitive adhesive film 804. In one embodiment, the pressure sensitive adhesive assembly 800 can be formed as a continuous roll. In another embodiment, the pressure sensitive adhesive assembly 800 can be formed as a continuous roll that includes perforations at prescribed intervals. The perforations can be formed in the release liners 802, 806 or through the release liners 802, 806 and the pressure sensitive adhesive film 804. In another aspect, the pressure sensitive adhesive assembly 800 can be formed as a sheet.

During assembly of a sonde, for example, the sonde 200 shown in FIG. 2 or the sonde 300 shown in FIG. 3, the release liners 802, 806 may be removed from the pressure sensitive adhesive film 804, as described below, and the pressure sensitive adhesive film 804 may be used to form the first polymer layer 216 (FIG. 2) and the second polymer layer 218 (FIG. 2) or the polymer layer 314 (FIG. 3). Further, during assembly of a scintillation device, for example, the scintillation device 400 shown in FIG. 4 or the detection device 500 shown in FIG. 5, the pressure sensitive adhesive film 804 may be used to form the polymer layer 418 (FIG. 4) or the polymer layer 514 (FIG. 5). Further, the pressure sensitive adhesive film 804 may be used to form the polymer layer 614 (FIG. 7).

In a particular embodiment, the pressure sensitive adhesive film 804 can be formed from a pressure sensitive adhesive. Further, the pressure sensitive adhesive can be formed by combining nanoparticles with a polymer formed from an (meth)acrylate monomer or a mixture of (meth)acrylate monomers and then optionally cross-linking or curing to form the pressure sensitive adhesive film 804. The pressure sensitive adhesive can also be formed by blending nanoparticles with an acrylic pressure sensitive adhesive solution, followed by coating, drying, and curing or crosslinking.

Prior to forming the pressure sensitive adhesive film 804, a pressure sensitive adhesive composition containing nanoparticles can be applied to a substrate using a variety of coating methods including, for example, spin coating, web coating, transfer coating, die coating, screen printing, electrospraying, and curtain coating. The substrate can be a release liner, e.g., the first release liner 802 or the second release liner 806.

The pressure sensitive adhesive film 804 can be optically clear, having low haze. In a particular embodiment, a layer of specified thickness (e.g. 25 micrometer dry thickness) of a pressure sensitive adhesive can include a haze value of no more than 10%. Moreover, the haze value can be a range between, and including, 0 to 5%, 0 to 3%, or even 0 to 1%. Haze can be measured using a spectrophotometer. Two intermediate measurements can be made: total luminous transmittance (TLT) and diffuse luminous transmittance (DLT). The ratio DLT/TLT provides a measurement of the haze of the pressure sensitive adhesive.

In a particular embodiment, the pressure sensitive adhesive film 804 can be optically clear and can have a high light transmittance over at least a portion of the visible spectrum. In certain aspects, a layer of specified thickness (e.g. 25 micrometer dry thickness) of pressure sensitive adhesive (PSA) has a visible light transmittance value, over at least a portion of the visible light spectrum, of at least 50%, and can be in a range from 75 to 100%, 85 to 100%, or even 90 to 100%. Visible light transmittance can also be measured using a spectrophotometer. The pressure sensitive adhesive film 704 can be capable of exhibiting a substantially colorless appearance, having a substantially uniformly high light transmittance over the visible spectrum.

In a particular aspect, the pressure sensitive adhesive film 804 can have a thickness of at least about 25 micrometers, such as at least about 50 micrometers, at least about 75 micrometers, at least about 100 micrometers, or at least about 125 micrometers. Further, the thickness may not be greater than about 250 micrometers, not greater than about 225 micrometers, not greater than about 200 micrometers, not greater than 175 micrometers, or not greater than 150 micrometers. In another aspect, the thickness can be within a range including any of the minimum and maximum values noted above.

In a particular embodiment, the pressure sensitive adhesive film 804 can include polyacrylate pressure sensitive adhesives. The Pressure-Sensitive Tape Council has defined pressure sensitive adhesives as materials with the following properties: (1) aggressive and permanent tack, (2) adherence with no more than finger pressure, (3) sufficient ability to hold onto an adherent, (4) sufficient cohesive strength, and (5) requires no activation by an energy source. Pressure sensitive adhesives are normally tacky at an assembly temperature, which is typically room temperature or greater (i.e., about 20° C. to about 30° C. or greater). Materials that have been found to function well as pressure sensitive adhesives are polymers designed and formulated to exhibit the requisite viscoelastic properties resulting in a desired balance of tack, peel adhesion, and shear holding power at the assembly temperature. Known polymers for preparing pressure sensitive adhesives can include natural rubber synthetic rubber- (e.g., styrene/butadiene copolymers (SBR) and styrene/isoprene/styrene (SIS) block copolymers), silicone elastomer-, poly alpha-olefin-, and various (meth)acrylate-(e.g., acrylate, methacrylate, or mixtures thereof) based polymers. Of these, (meth) acrylate-based polymer PSAs are an exemplary class of PSA for use with the disclosed adhesives due to their optical clarity, permanence of properties over time (aging stability), and versatility of adhesion levels, to name just a few of their benefits.

Examples of (meth)acrylate monomers for preparing a poly(meth)acrylate pressure sensitive adhesive can include the following classes:

Class A—includes acrylic acid esters of an alkyl alcohol, the alcohol containing from 2 to 8 or from 4 to 8 carbon atoms and include, for example ethyl acrylate, isopropyl acrylate, isoamyl acrylate, sec-butyl acrylate, n-butyl acrylate, 2-methylbutyl acrylate, 4-methyl-2-pentyl acrylate, 2-(ethyl)hexyl acrylate, isooctyl acrylate and mixtures thereof. Of these, isooctyl acrylate, n-butyl acrylate and 2-(ethyl)hexyl acrylate are exemplary. As homopolymers, these acrylate esters generally have glass transition temperatures (Tg) of below about 0 degrees Celsius.

Class B—includes (meth)acrylate or other vinyl monomers which, as homopolymers, have glass transition temperatures (Tg) of greater than about 0° C., for example, methyl acrylate, methyl methacrylate, ethyl methacrylate, isopropyl methacrylate, tert-butyl acrylate, isobornyl (meth)acrylate, butyl methacrylate, vinyl acetate, vinyl esters, and mixtures thereof. The class B monomers can be used in a pressure sensitive adhesive to vary the Tg and the modulus of the adhesives.

Class C—includes polar monomers such as (meth)acrylic acid; (meth)acrylamides such as N-alkyl (meth)acrylamides and N,N-dialkyl (meth)acrylamides; hydroxy alkyl (meth) acrylates; and N-vinyl lactams such as N-vinyl pyrrolidone and N-vinyl caprolactam; 2-(dimethylamino)ethyl (meth) acrylate, 2-(diethylamino)ethyl (meth)acrylate, and 3-(dimethylamino)propyl (meth)acrylate; acrylonitrile. The polar monomers can be included in the PSA compositions to adjust Tg or the cohesive strength of the adhesive. Additionally, the polar monomers can function as reactive sites for chemical or ionic crosslinking, if desired.

Class D (Crosslinkers)—In order to increase cohesive strength of the poly(meth)acrylate pressure sensitive adhesives, a crosslinking additive may be incorporated into the pressure sensitive adhesive. The crosslinking additive can include a thermal crosslinking additive such as multifunctional aziridine, isocyanate and epoxy. One example of aziridine crosslinker is 1,1'-(1,3-phenylene dicarbonyl)-bis-(2-methylaziridine) (CAS No. 7652-64-4), referred to herein as "Bisamide." Common polyfunctional isocyanate crosslinkers are trimethylolpropane toluene diisocyanate, toluene diisocyanate, etc. Such chemical crosslinkers can be added into solvent-based pressure sensitive adhesives after polymerization and activated by heat during oven drying of the coated adhesive.

In another embodiment, chemical crosslinkers, which rely upon free radicals to carry out the crosslinking reaction, can be used. Reagents such as, peroxides serve as a source of free radicals. When heated sufficiently, these precursors can generate free radicals which bring about a crosslinking reaction of the polymer. A common free radical generating reagent includes benzoyl peroxide. Free radical generators can be included in small quantities, but generally require relatively higher temperatures to complete a crosslinking reaction than those required for the bisamide and isocyanate reagents.

In yet another aspect, the crosslinking additive can include a photosensitive crosslinker, which can be activated by high intensity ultraviolet (UV) light. Photosensitive crosslinkers used for acrylic PSAs can include benzophenone and copolymerizable aromatic ketone monomers. Another photocrosslinker, which can be post-added to the solution polymer and activated by UV light is a triazine, for example, 2,4-bis(trichloromethyl)-6-(4-methoxy-phenyl)-s-triazine. These crosslinkers can be activated by UV light generated from sources such as medium pressure mercury lamps or a UV blacklight. Hydrolyzable, free-radically copolymerizable crosslinkers, such as monoethylenically unsaturated mono-, di-, and trialkoxy silane compounds including, but not limited to, methacryloxypropyltrimethoxysilane, vinyl dimethylethoxysilane, vinyl methyl diethoxysilane, vinyltriethoxysilane, vinyltrimethoxysilane, vinyltriphenoxysilane, and the like, are also useful crosslinking agents. Crosslinking can also be achieved using high energy electromagnetic radiation such as gamma or e-beam radiation. In such an aspect, a crosslinker may not be required.

Class E (Additives)—Following copolymerization, other additives can be blended with the resultant poly(meth)acrylate pressure sensitive adhesives. For example, compatible tackifiers, plasticizers, or a combination thereof, can be added to aid in optimizing the ultimate modulus, Tg, tack and peel properties of the PSA. Tackifiers can include, but are not limited to, rosin, rosin derivatives, polyterpene resins, coumarone-indene resins, and the like. Plasticizers can be selected from a wide variety of commercially available materials. In each case, the added plasticizer should be compatible with the pressure sensitive adhesive. For example, plasticizers can include polyoxyethylene aryl ether, dialkyl adipate, 2-ethylhexyl diphenyl phosphate, 4-(t-butyl)phenyl diphenyl phosphate, bis(2-ethylhexyl) adipate, toluenesulfonamide, dipropylene glycol dibenzoate, polyethylene glycol dibenzoate, polyoxypropylene aryl ether, bis(butoxyethoxyethyl) formal, or bis(butoxyethoxyethyl) adipate.

In a particular embodiment, the pressure sensitive adhesives can be prepared by solution polymerization, emulsion polymerization, bulk polymerization, or a combination thereof. Adhesive properties of the pressure sensitive adhesives can be influenced by the compositions and ratios of the monomers chosen for copolymerization as described above in the Classes A to C. The pressure sensitive adhesive properties can be further modified, by adding crosslinker (Class D), an additive (Class E), or a combination thereof.

In a particular embodiment, the optically clear pressure sensitive adhesive film 804 can be formed by combining nanoparticles with a pressure sensitive adhesive comprising butyl acrylate and acrylic acid and forming the optically clear pressure sensitive adhesive film 804. In another embodiment, the optically clear pressure sensitive adhesive film 804 can be formed by combining nanoparticles with a pressure sensitive adhesive comprising 90-95% wt butyl acrylate and 5-10% wt acrylic acid, and coating and drying the composition to form the optically clear pressure sensitive adhesive film 804. In yet another embodiment, the optically clear pressure sensitive adhesive film 804 can be formed by combining nanoparticles with a pressure sensitive adhesive comprising butyl acrylate, methyl acrylate and acrylic acid, and forming the optically clear pressure sensitive adhesive film 804. In still another embodiments, the optically clear pressure sensitive adhesive film 804 can be formed by combining nanoparticles with a pressure sensitive adhesive comprising 55-65% wt butyl acrylate, 35-45% wt methyl acrylate, and 1-5% wt acrylic acid, and coating and drying the composition to form the optically clear pressure sensitive adhesive film 804. In one or more of these embodiments, a cross-linker such as, bisamide can be added to the compositions.

In a particular aspect, nanoparticles can be included in the optically clear pressure sensitive adhesive film 804. For example, the pressure sensitive adhesive film 804 can include from 1 to 70 wt % nanoparticles, or from 5 to 70% wt, or from 10 to 60 wt %, or from 30 to 60 wt %. Skill artisans can appreciate that the nanoparticle loading on a wt % basis can be be affected by the density of the nanoparticles. The nanoparticles can have a mean diameter of 3 to 100 nanometers, or 5 to 75 nanometers, or 5 to 50 nanometers, or 5 to 30 nanometers. In a particular aspect, the nanoparticles can be hydrophobic. In another aspect, the nanoparticles can be made from any useful material such as, a metal oxide. In certain embodiments, the nanoparticles can be surface-modified.

The surface-modified nanoparticles can be selected such that the composition formed therewith is substantially free from a degree of particle agglomeration or aggregation that could interfere with the desired properties of the composition. The surface-modified nanoparticles can be selected to be compatible with the pressure sensitive adhesive composition.

The surface-modified nanoparticles have surface groups that can modify the solubility characteristics of the nanoparticles. The surface groups can be selected to render the particle compatible with the pressure sensitive adhesive composition. When the composition is polymerizable, for example, the surface groups can be selected to associate or react with at least one component of the pressure sensitive adhesive composition to become part of the polymer network of the pressure sensitive adhesive composition.

The surface groups can be present on the surface of the particle in an amount sufficient to provide surface-modified nanoparticles that are capable of being subsequently dispersed in the pressure sensitive adhesive composition without aggregation. The surface groups can be present in an amount sufficient to form a monolayer, preferably a continuous monolayer, on the surface of the particle.

Surface modifying groups can be be derived from surface modifying agents. Schematically, surface modifying agents can be represented by the formula A-B, where the A group is capable of attaching to the surface of the particle and the B group is a compatibilizing group that may be reactive or non-reactive with a component of the composition. Compatibilizing groups can be selected to render the particle relatively more polar, relatively less polar or relatively non-polar.

Suitable classes of surface-modifying agents can include, e.g., silanes, organic acids organic bases, and alcohols. Particularly useful surface-modifying agents include silanes.

Examples of useful silanes include organosilanes including, e.g., alkylchlorosilanes, alkoxysilanes, e.g., methyltrimethoxysilane, methyltriethoxysilane, ethyltrimethoxysilane, ethyltriethoxysilane, n-propyltrimethoxysilane, n-propyltriethoxysilane, isopropyltrimethoxysilane, isopropyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, isooctyltriethoxysilane phenyltriethoxysilane, phenyltrimethoxysilane, vinyltrimethoxysilane, vinyidimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltris(t-butoxy)silane, vinyltris(isobutoxy)silane, vinyltris(isopropenoxy)silane and vinyltris(2-methoxyethoxy)silane; trialkoxyarylsilanes; isooctyltrimethoxysilane; N-(3-triethoxysilylpropyl) methoxyethoxyethoxy ethyl carbamate; N-(3-triethoxysilylpropyl) methoxyethoxyethoxyethyl carbamate; silane functional (meth)acrylates including, e.g., 3-(methacryloyloxy)propyltrimethoxysilane, 3-acryloyloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)methyltriethoxysilane, 3-(methacryloyloxy)methyltrimethoxysilane, 3-(methacryloyloxy)propyldimethylethoxysilane, 3-(methacryloyloxy)propenyltrimethoxysilane and 3-(methacryloyloxy)propyltrimethoxysilane; polydialkylsiloxanes including, e.g., polydimethylsiloxane, arylsilanes including, e.g., substituted and unsubstituted arylsilanes, alkylsilanes including, e.g., substituted and unsubstituted alkyl silanes including, e.g., methoxy and hydroxy substituted alkyl silanes, and combinations thereof.

Useful organic acid surface-modifying agents can include, e.g., oxyacids of carbon (e.g., carboxylic acid), sulfur and phosphorus, and combinations thereof. Representative examples of polar surface-modifying agents having carboxylic acid functionality include $CH_3O(CH_2CH_2O)_2CH_2COOH$ (hereafter MEEAA) and 2-(2-methoxyethoxy)acetic acid having the chemical structure $CH_3OCH_2CH_2OCH_2COOH$ (hereafter MEAA) and mono(polyethylene glycol) succinate.

Representative examples of non-polar surface-modifying agents having carboxylic acid functionality can include octanoic acid, dodecanoic acid and oleic acid.

Examples of suitable phosphorus containing acids can include phosphonic acids including, e.g., octylphosphonic acid, laurylphosphonic acid, decylphosphonic acid, dodecylphosphonic acid and octadecylphosphonic acid.

Useful organic base surface-modifying agents can include, e.g., alkylamines including, e.g., octylamine, decylamine, dodecylamine and octadecylamine.

Examples of other useful non-silane surface modifying agents can include acrylic acid, methacrylic acid, beta-carboxyethyl acrylate, mono-2-(methacryloyloxyethyl) succinate, and combinations thereof. A useful surface modifying agent that imparts both polar character and reactivity to the nanoparticles is mono(methacryloyloxypolyethyleneglycol) succinate.

Examples of suitable surface-modifying alcohols can include, e.g., aliphatic alcohols including, e.g., octadecyl, dodecyl, lauryl and furfuryl alcohol, alicyclic alcohols including, e.g., cyclohexanol and aromatic alcohols including, e.g., phenol and benzyl alcohol, and combinations thereof.

The nanoparticles used in the pressure sensitive adhesives can be nonabsorbing (at wavelengths of interest) metal oxide or semiconductor particles. Examples of suitable nanoparticles include, but are not limited to, $SiO_2$, $Al_2O_3$, $ZrO_2$, $TiO_2$, $V_2O_5$, ZnO, $SnO_2$, ZnS, and combinations thereof. Additionally, the particles can include species that have a core of one material on which is deposited a material of another type. The nanoparticles can have an average particle diameter less than about 100 nm, or no greater than about 50 nm. Further, the nanoparticles can be any useful size, e.g., having a mean diameter of 3 to 100 nanometers, or 5 to 75 nanometers, or 5 to 50 nanometers, or 5 to 30 nanometers. If the nanoparticles are aggregated, the maximum cross sectional dimension of the aggregated particle can be within any of these ranges.

Useful surface-modified zirconia nanoparticles include a combination of oleic acid and acrylic acid adsorbed onto the surface of the particle.

Useful surface-modified silica nanoparticles include silica nanoparticles surface-modified with silane surface modifying agents including, e.g., acryloyloxypropyl trimethoxysilane, 3-methacryloyloxypropyltrimethoxysilane, 3-mercaptopropyltrimethoxysilane, n-octyltrimethoxysilane, isooctyltrimethoxysilane, phenyltrimethoxysilane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl)silanes, and combinations thereof and organozirconates, organotitanates or mixtures thereof.

The nanoparticles may be in the form of a colloidal dispersion. Examples of useful commercially available unmodified silica starting materials can include nano-sized colloidal silicas. In some embodiments, the pressure sensitive adhesive film can include modified silica nanoparticles from 5 to 60 wt %, or from 10 to 50 wt %, or from 20 to 50 wt %.

Other useful metal oxide colloidal dispersions can include colloidal zirconium oxide, and colloidal titanium oxide.

Various methods can be used to combine the surface-modified nanoparticles and the pressure sensitive adhesive composition. In one method, a colloidal dispersion of surface-modified nanoparticles and pressure sensitive adhesive can be combined. Solvent present in the composition can be removed to leave the surface-modified nanoparticles dispersed in the pressure sensitive adhesive composition. The solvent can be removed by evaporation including, e.g., distillation, rotary evaporation or oven drying. Optionally, for some colloidal dispersions, e.g., aqueous colloidal dispersions, prior to addition of the pressure sensitive adhesive composition, a cosolvent (e.g., methoxy-2-propanol or N-methylpyrrolidone) can be added to the colloidal dispersion to assist the removal of water. After the pressure sensitive adhesive composition is added, the water and cosolvent can be removed.

Another method for incorporating colloidal dispersions of surface-modified nanoparticles into a pressure sensitive adhesive composition can include drying the colloidal dispersion of surface-modified nanoparticles to a powder, followed by the addition of the pressure sensitive adhesive composition or at least one component of the pressure sensitive adhesive composition into which the nanoparticles are to be dispersed. The drying step can be accomplished by conventional means such as oven drying or spray drying. The surface-modified nanoparticles can have a sufficient amount of surface groups to prevent irreversible agglomeration or irreversible aggregation upon drying. The drying time and the drying temperature can be reduced for nanoparticles having less than 100% surface coverage.

Figure 9:
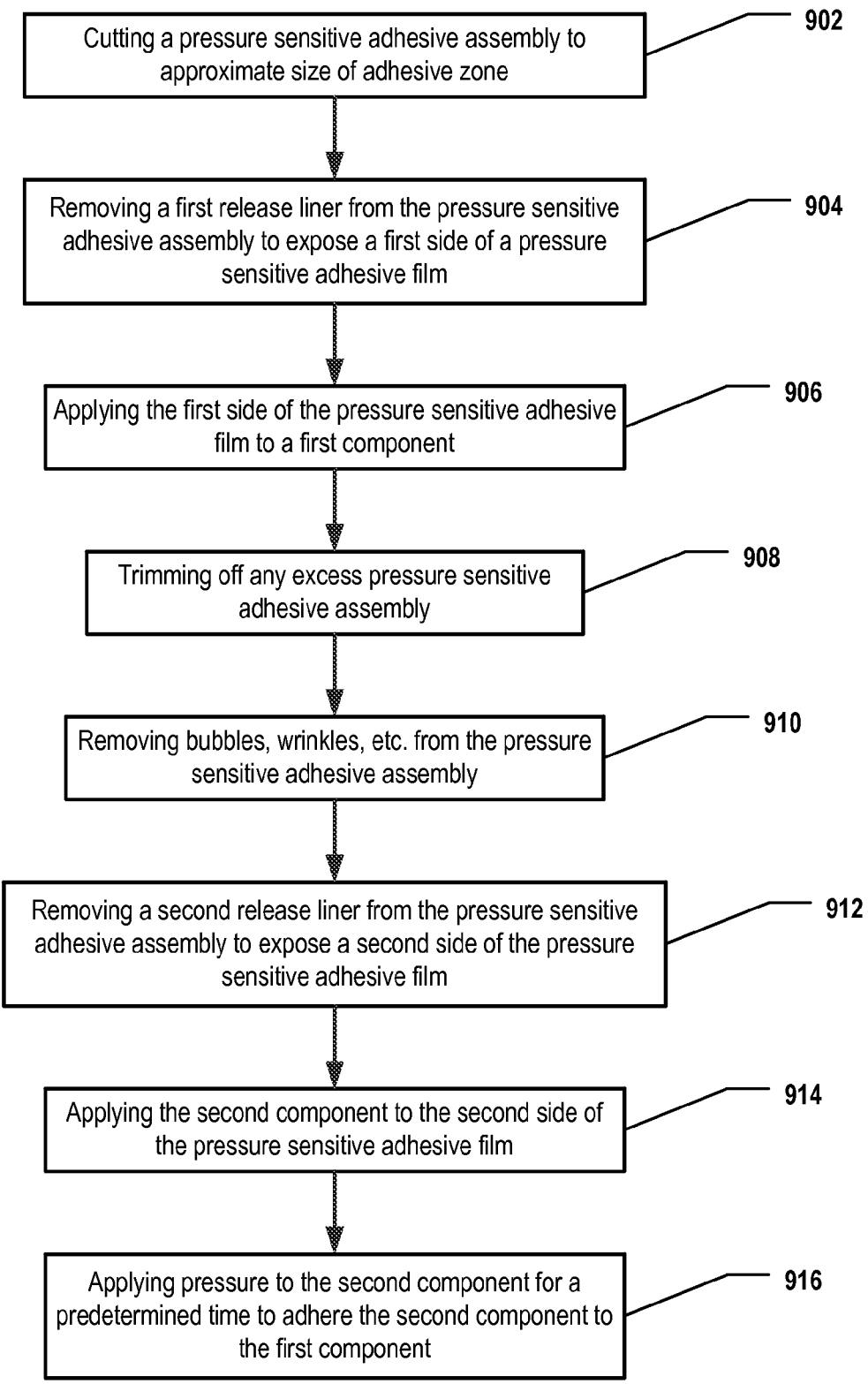
FIG. 9 includes a flow chart illustrating a method of assembling a scintillation device.

Referring now to FIG. 9, a method of assembling a scintillation device is illustrated and is commences at block 902. At block 902, the method can include cutting a polymer assembly, e.g., a pressure sensitive adhesive assembly to an approximate size of a first adhesion zone. The first adhesion zone can be a surface of a first component, e.g., an end of a scintillation device, an end of a scintillator, a window surface, an end of a photosensor, a surface of a photosensor window, a surface of a light pipe, etc.

In a particular aspect, the first component can include a photosensor, a light pipe, a window, a scintillator, or a scintillation device. Moving to block 904, the method can include removing a first release liner from the pressure sensitive adhesive assembly to expose a first side of a polymer film, e.g., a pressure sensitive adhesive film. Thereafter, at block 906, the method can include applying the first side of the pressure sensitive adhesive film to the first adhesion zone of the first component.

Moving to block 908, the method can include trimming off any excess pressure sensitive adhesive assembly, i.e., the excess of the pressure sensitive film and the remaining release liner. At block 910, the method can include removing any distortions from the pressure sensitive adhesive assembly. The removing step can include rolling a roller along the pressure sensitive adhesive assembly. The roller may be cylindrical roller, a spherical roller, or some other roller known in the art.

In a particular aspect, the distortions can include any areas of non-adhesion between the first side of pressure sensitive adhesive film and the first adhesion zone of the first component. For example, the distortions can include bubbles, wrinkles, or a combination thereof in the pressure sensitive adhesive film.

In a particular aspect, after the removing step is performed, the first side of the pressure sensitive adhesive film can be at least about 95% free of distortions, such as at least about 96% free of distortions, at least about 97% free of distortions, at least about 98% free of distortions, at least about 99% free of distortions, at least about 99.5% free of distortions, or at least about 99.9% free of distortions. In another aspect, the first side of the pressure sensitive adhesive film can be 100% free of distortions.

In yet another aspect, an adhesive percentage can provide a measure of adhesion between the first side of the pressure sensitive adhesive film and the adhesion zone of the first component. Particularly, the adhesion percentage can be at least about 95%, such as at least about 96%, at least about 97%, at least about 98%, at least about 99%, at least about 99.5%, or at least about 99.9%. In another aspect, the adhesion percentage may be 100%.

In a particular aspect, the adhesion percentage can be determined by dividing a total area of adhesion by an area of an adhesion zone and multiplying by one hundred. The total are of adhesion can be determined through a visual inspection of the interface between the adhesive film and the adhesion zone to determine the total area of the adhesive film that is not adhered to the adhesion zone. The area of non-adhesion may be subtracted from the total area of the adhesion zone (or the surface area of a side of the adhesive film cut to the size of the adhesion zone) in order to determine the area of adhesion. In a particular aspect, a visual aid, such as a microscope, may aid in the determination of the area of non-adhesion.

Returning to the description of the method, at block 912, the method can include removing a second release liner from the pressure sensitive adhesive assembly to expose a second side of the pressure sensitive adhesive film. At block 914, the method can include applying an adhesion zone of the second component to the second side of the pressure sensitive adhesive film. In a particular aspect, the second component can include a photosensor, a light pipe, a window, a scintillator, or a scintillation device. Further, the adhesion zone of the second component can include an end of a scintillation device, an end of a scintillator, a window surface, an end of a photosensor, a surface of a photosensor window, a surface of a light pipe, etc.

At block 916, the method can include a pressing step that includes applying pressure to the second component for a predetermined time to adhere the second component to the first component via the pressure sensitive adhesive film. In a particular aspect, the pressure can be at least about 10 psi (68.9 kPa), at least about 15 psi (103.4 kPa), at least about 25 psi (172.4 kPa), or at least about 50 psi (344.7 kPa). In another aspect, the assembly pressure may be no greater than about 130 psi (896.3 kPa), no greater than about 115 psi (792.9 kPa), no greater than about 100 psi (689.5 kPa), or no greater than about 75 psi (517.1 kPa). In another aspect, the assembly pressure can be within a range including any of the minimum and maximum values noted above.

In a particular aspect, after the pressing step is performed, the second side of the pressure sensitive adhesive film can be at least about 95% free of distortions, such as at least about 96% free of distortions, at least about 97% free of distortions, at least about 98% free of distortions, at least about 99% free of distortions, at least about 99.5% free of distortions, or at least about 99.9% free of distortions. In another aspect, the second side of the pressure sensitive adhesive film can be 100% free of distortions.

In another aspect, the adhesive percentage between the second side of the pressure sensitive adhesive film and the adhesion zone of the second component can be at least about 95%, such as at least about 96%, at least about 97%, at least about 98%, at least about 99%, at least about 99.5%, or at least about 99.9%. In another aspect, the adhesion percentage may be 100%.

In a particular aspect, the method steps may be repeated to in order to attach, or otherwise affix, a third component to the first component or the second component using a second pressure sensitive adhesive assembly. Moreover, the steps may not be performed in the exact order illustrated in FIG. 9 and that words such, as "thereafter," "then," "next," etc. are used in the description of the method to simply guide the reader through the method steps as depicted. However, these words are not meant to limit the order of the method steps.

EXAMPLES/TESTING

A scintillator assembly is assembled from a clear acrylic plastic substrate, a scintillator layer, and an adhesive layer. The clear plastic substrate includes BC-802 Premium UVA Acrylic Plastic sold by Saint-Gobain and is approximately 35.179 millimeters (1.385 inches) thick. The scintillator layer includes BC-400 Polyvinyl Toluene and Organic Fluors sold by Saint-Gobain and is approximately 0.152 millimeters (0.006 inches) thick. The adhesive includes 8141 optically clear laminating adhesive sold by 3M and is applied in two layers so that the adhesive layer is approximately 0.051 millimeters (0.002 inches) thick. The scintillator assembly is approximately 360.553 millimeters (14.195 inches) long, 158.496 millimeters (6.240 inches) wide, and 35.382 millimeters (1.393 inches) thick.

The testing of the scintillator assembly includes exposing the scintillator assembly to a temperature cycle between 25° C. and 55° C. at a temperature change of 3° C. per minute with a 1 hour hold at each end of the temperature range. Starting at 25° C. the temperature is increased by 3° C. per minute until 55° C. is reached. Thereafter, the temperature is held at 55° C. for 1 hour. Then, the temperature is decreased by 3° C. per minute until 25° C. is reached. The temperature is held at 25°

C. for 1 hour. This cycle is repeated 10 times. After testing is complete no signs of failure were observed. Typical signs of failure include the formation of micro-cracks in the scintillator layer.

A comparison scintillator assembly is assembled from a clear acrylic plastic substrate, a scintillator layer, and an adhesive layer. The clear plastic substrate includes BC-802 Premium UVA Acrylic Plastic sold by Saint-Gobain and is approximately 35.179 millimeters (1.385 inches) thick. The scintillator layer includes BC-400 Polyvinyl Toluene and Organic Fluors sold by Saint-Gobain and is approximately 0.152 millimeters (0.006 inches) thick. The adhesive includes Epoxy V that is mixed per Emp-105 that is applied per BAP-200-103 and is approximately 0.051 millimeters (0.002 inches) thick. The scintillator assembly is approximately 360.553 millimeters (14.195 inches) long, 158.496 millimeters (6.240 inches) wide, and 35.382 millimeters (1.393 inches) thick.

The sondes described herein can be used in a subterranean environment, e.g., for well logging. The polymer layers within the sondes can provide effective optical interfaces between the photosensor and the light pipe, between the scintillation device and the light pipe, and between the photosensor and the scintillation device. Additionally, the polymer layer within the scintillation device can provide an effective optical interface between the scintillator and the window. The polymer layer within the detector device can also provide an effective optical interface between the scintillator and the photosensor.

Each of the polymer layers can be optically transparent and can be substantially free of any distortions that can affect the sensitivity of the devices in which the layers are installed. Further, the manner in which the polymer film comprising the polymer layers is installed can ensure substantially complete adhesion between the polymer film and the components attached thereto. Also, the use of the polymer layer described herein can eliminate the use of a light pipe between a scintillation device and a photosensor.

Using the polymer film to form the polymer layers can eliminate problems associated with other optical interfaces. For example, using a silicone material to form an optical interface can be quite messy and can require a myriad of additional steps and tools. The outer surface of a component on which the silicone material is applied can be masked, using tape, to reduce contamination of the outer surface of the component as the silicone flows down the outer surface during installation. After the silicone cures, the tape can be removed and any further residual silicone on the side of the component can be removed using a solvent. However, removal of the cured silicone may be very difficult, and in many cases, not all of the cured silicone can be removed. Further, during a curing step, tooling, such as an alignment fixture, can be used to hold the components in proper alignment while the silicone cures.

Accordingly, using the polymer film to form the polymer layers can substantially reduce the risk of contaminating surfaces of the components adhered to the polymer film that are not in contact with the polymer film. Further, several manufacturing steps can be reduced by using the polymer film to form the polymer layers and the use of certain tooling can be eliminated. As such, the cost of manufacturing sondes, scintillation devices, detector devices, and other devices in which the polymer film is used as described herein, can be substantially reduced.

In another aspect, using the polymer film to form a polymer layer interface between a scintillator plastic layer and a clear substrate (e.g., a light guide or light pipe) can substantially reduce micro-cracks from forming due to differences in thermal expansion rates of the materials comprising the scintillator and the clear substrate. When an epoxy is used as an interface between the scintillator and the clear substrate, it has been observed that micro-cracks can form in the scintillator due to different rates of expansion and contraction of the scintillator material and the substrate material. As such, using the polymer film substantially reduces the likelihood of the formation of micro-cracks in the scintillator layer and the likelihood of failure of a scintillator assembly including the scintillator layer.

Although the scintillation device and the detector device can be installed in well logging sondes, as described herein, the scintillation device and the detector device can be used in other detectors in which exposure to water is possible. For example, the scintillation device and detector device can be used in other outdoor environments such as within port-of-entry detectors.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In addition, in the foregoing Detailed Description, various features can be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter can be directed to less than all features of any of the disclosed embodiments. Thus, the following claims are incorporated into the Detailed Description, with each claim standing on its own as defining separately claimed subject matter.

What is claimed is:

1. A detector device, comprising:
   a housing having an open end and a closed end;
   a photosensor within the housing; and
   a scintillation device within the housing adjacent to the photosensor, wherein the scintillation device comprises:
      a scintillator;
      a polymer layer comprising:
         a first major surface coupled to an end of the photosensor;
         a second major surface coupled to an end of the scintillator; and
         a side surface extending between the first major surface and the second major surface; wherein the polymer layer includes carbon along a backbone of the polymer, and
      a reflector including a fluorinated polymer and at least partially surrounding the scintillator and the photosensor, wherein the reflector including a fluorinated polymer extends over and is in direct contact with the entire side surface of the polymer layer.

2. The detector device of claim 1, wherein the polymer layer is optically transparent.

3. The detector device of claim 1, wherein the polymer layer has a transparency of at least 80% for a wavelength range from 350 nm to 700 nm.

4. The detector according to claim 1, wherein the fluorinated polymer includes polytetrafluoroethylene.

5. The detector according to claim 4, wherein the reflector consists essentially of polytetrafluoroethylene.

6. The detector device of claim 1, wherein the polymer layer comprises an initial viscosity at 25° C. of at least about 10,000 Pa·s, at least about 15,000 Pa·s, at least about 20,000 Pa·s, at least about 25,000 Pa·s, at least about 30,000 Pa·s, or at least about 35,000 Pa·s.

7. The detector device of claim 1, wherein the polymer layer has a density of less than about 1.50 g/cm$^3$, less than about 1.25 g/cm$^3$, less than about 1.20 g/cm$^3$, less than about 1.15 g/cm$^3$, less than about 1.10 g/cm$^3$, less than about 1.05 g/cm$^3$, or less than about 1.00 g/cm$^3$.

8. The detector device of claim 1, wherein the polymer layer includes a Shore "00" durometer of at least about 20, at least about 25, at least about 30, or even at least about 35.

9. The detector device of claim 1, wherein the polymer layer comprises a substantially uniform thickness.

10. The detector device of claim 1, wherein the detector device is configured for use in a subterranean or outdoor environment.

11. The detector device of claim 1, wherein the detector device is at least part of a well-logging apparatus or an outdoor port-of-entry detector.

12. The detector device of claim 1, wherein the polymer layer comprises a pressure sensitive adhesive.

13. The detector device of claim 1, wherein a first side of the polymer layer is at least about 95% free of distortions, at least about 96% free of distortions, at least about 97% free of distortions, at least about 98% free of distortions, at least about 99% free of distortions, at least about 99.5% free of distortions, or at least about 99.9% free of distortions.

14. The detector device of claim 1, wherein an adhesion percentage between the first major surface of the polymer layer and a first adhesion zone defined by the end of the photosensor is at least about 95%, such as at least about 96%, at least about 97%, at least about 98%, at least about 99%, at least about 99.5%, or at least about 99.9%.

15. The detector device of claim 1, wherein an adhesion percentage between the second major surface of the polymer layer and a second adhesion zone defined by the end of the scintillator is at least about 95%, such as at least about 96%, at least about 97%, at least about 98%, at least about 99%, at least about 99.5%, or at least about 99.9%.

16. A detector device, comprising:
a housing;
a photosensor disposed within the housing;
a scintillator disposed within the housing adjacent to the photosensor, wherein the scintillator is coupled to the photosensor via a first polymer layer; and
a reflector including a fluorinated polymer and at least partially surrounding the scintillator, wherein the reflector including a fluorinated polymer is coupled to the scintillator via a second polymer layer including an adhesive.

17. The detector device of claim 16, wherein the reflector includes polytetrafluoroethylene.

18. The detector of claim 17, wherein the reflector consists essentially of polytetrafluoroethylene.

19. A detector device, comprising:
a housing;
a single photosensor disposed within the housing;
a scintillation assembly within the housing adjacent to the photosensor, wherein the scintillation assembly comprises:
a plurality of scintillators including at least a first scintillator and a second scintillator,
an optically transparent polymer layer disposed between the first scintillator and the second scintillator,
wherein no reflective material is disposed between the first scintillator and the second scintillator.

20. The detector device of claim 19, wherein a reflector material is disposed adjacent to an outer side surface of the first and second scintillators and opposite the photosensor.

* * * * *